(12) United States Patent
Knezevic et al.

(10) Patent No.: US 10,989,267 B2
(45) Date of Patent: Apr. 27, 2021

(54) DAMPING VALVE FOR A VIBRATION DAMPER

(71) Applicant: ZF FRIEDRICHSHAFEN AG, Friedrichshafen (DE)

(72) Inventors: Aleksandar Knezevic, Eitorf (DE); Jörg Rösseler, Ruppichteroth (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 138 days.

(21) Appl. No.: 16/335,634

(22) PCT Filed: Aug. 11, 2017

(86) PCT No.: PCT/EP2017/070448
§ 371 (c)(1),
(2) Date: Mar. 21, 2019

(87) PCT Pub. No.: WO2018/054604
PCT Pub. Date: Mar. 29, 2018

(65) Prior Publication Data
US 2019/0301558 A1 Oct. 3, 2019

(30) Foreign Application Priority Data
Sep. 23, 2016 (DE) .................... 10 2016 218 373.7

(51) Int. Cl.
*F16F 9/348* (2006.01)
(52) U.S. Cl.
CPC .................... *F16F 9/3484* (2013.01)
(58) Field of Classification Search
CPC .................................................. F16K 47/023
USPC ....... 188/282.6, 282.1, 282.8, 282.5, 322.14, 188/322.15; 137/854, 856
See application file for complete search history.

(56) References Cited

U.S. PATENT DOCUMENTS

| | | | | |
|---|---|---|---|---|
| 2,948,357 A | * | 8/1960 | Cookson | F16F 9/46 188/322.14 |
| 3,981,380 A | * | 9/1976 | Andre | F16F 1/32 188/282.9 |
| 5,379,799 A | * | 1/1995 | Kawai | F04B 39/1073 137/856 |
| 5,529,154 A | | 6/1996 | Tanaka | |
| 5,547,050 A | * | 8/1996 | Beck | F16F 9/3214 188/282.5 |

(Continued)

FOREIGN PATENT DOCUMENTS

| | | |
|---|---|---|
| CH | 483 587 | 12/1969 |
| DE | 18 17 391 | 12/1968 |

(Continued)

*Primary Examiner* — Robert A. Siconolfi
*Assistant Examiner* — San M Aung
(74) *Attorney, Agent, or Firm* — Cozen O'Connor

(57) ABSTRACT

A damping valve for a vibration damper includes a damping valve body with a through-channel whose outlet opening is at least partially closed by at least one elastically deformable valve disk. A further valve element is associated with the valve disk. This further valve element predetermines a defined lift behavior for the valve disk proceeding from a valve seat surface. The further valve element is formed by an elastic coating of the valve disk that exerts a varying supporting force with respect to the valve disk via the configuration of the top surface of the valve disk.

9 Claims, 5 Drawing Sheets

(56) References Cited

U.S. PATENT DOCUMENTS

| | | | | |
|---|---|---|---|---|
| 5,647,395 A | * | 7/1997 | Hashimoto | ......... F04B 39/1073 |
| | | | | 137/514 |
| 2012/0138837 A1 | * | 6/2012 | Handke | ................. F16F 9/3485 |
| | | | | 251/337 |
| 2012/0160624 A1 | * | 6/2012 | Katayama | ............... F16F 9/468 |
| | | | | 188/314 |
| 2015/0152936 A1 | | 6/2015 | Kim | |

FOREIGN PATENT DOCUMENTS

| | | |
|---|---|---|
| DE | 35 03 152 | 8/1986 |
| DE | 38 16 539 | 12/1988 |
| DE | 10 2006 031 179 | 12/2007 |
| DE | 10 2007 007 722 | 6/2008 |
| DE | 10 2015 206 022 | 10/2016 |
| EP | 1 600 662 | 11/2005 |
| GB | 2 233 064 | 1/1991 |
| JP | 2008 274 991 | 11/2008 |

\* cited by examiner

DAMPING VALVE FOR A VIBRATION DAMPER

CROSS REFERENCE TO RELATED APPLICATIONS

This is a U.S. national stage of application No. PCT/EP2017/070448, filed on Aug. 11, 2017. Priority is claimed on German Application No. DE102016218373.7, filed Sep. 23, 2016, the content of which is incorporated herein by reference.

BACKGROUND OF THE INVENTION

1. Field of the Invention

The invention is directed to a damping valve for a vibration damper.

2. Description of Prior Art

Up to the present time, there has been a pronounced effort toward a defined lifting behavior of a valve disk from a damping valve body, which can prevent noise from abruptly lifting valve disks.

A proven remedy is a combination of two valve disks, one valve disk having a cutout at the edge into which the adjacent valve disk can penetrate. U.S. Pat. No. 5,529,154 discloses this constructional form in different variants. However, an associated problem exists in that the valve disk to be deformed is exposed to a high area pressure in the region of the contacting edges of the neighboring disk.

CH 483 587 or DE 38 16 539 A1 describes a check valve that has a metal valve disk combined with an elastomeric coating. The elastomeric coating serves as impact protection.

SUMMARY OF THE INVENTION

It is an object of one aspect of the present invention to solve the problem existing in connection with area pressure.

The above-stated object is met in that the further valve element is formed by an elastic coating of the valve disk, which exerts a varying supporting force with respect to the valve disk via the configuration of the top surface of the valve disk.

The advantage consists in that no additional assembly effort need be expended for the further valve element. Furthermore, the fixed body edges of the additional valve disk, which are known from the prior art, are dispensed with. Consequently, no increased area pressure can occur between two adjacent valve disks in the present solution.

A possibility for adapting the supporting forces consists in that the coating covers only a partial area of the valve disk. The coating is fixedly connected to the valve disk. Consequently, there is a greater spring rate for the valve disk in the area of contact with the coating than in the partial area that is not coated.

As another setting parameter for the lift behavior of the valve disk, there is the possibility that the coating has a varying thickness. In this way, an increased spring rate of the valve disk can be introduced at points but also over a larger surface area. The lift behavior can be influenced selectively via the distribution of different spring rates at the surfaces that are acted upon by pressure.

In a further advantageous configuration, the varying thickness is carried out in the form of a rib profile that defines displacer spaces. In practice, the rib profile can define small pressure chambers connected to one another via an overflow system so that the damping medium located in the pressure chambers can escape during a compression of the displacer spaces and can accordingly develop a damping force.

An especially simple construction is characterized in that the coating is carried out off-center with respect to a main axis of the valve disk.

Valve disks are often fixedly clamped in at the inner diameter or outer diameter such that only the free diameter lifts from the valve seat surface. The coating is carried out outside of a clamping surface of the valve disk so that no additional spring effect is introduced into the clamping chain between valve disk and damping valve body via the coating.

In addition to the function of the defined lift movement, it can also be provided that the coating is formed as a stop limit in lift direction of the valve disk. Impact noises, e.g., at a supporting disk of the damping valve, are prevented in this way. The supporting disk serves to limit the lift of the valve disk.

Alternatively or additionally, the coating can be carried out in impact direction on the valve seat surface in order to prevent impact noises during the closing movement.

The coating makes it possible to use a valve disk having constant material thickness and to dispense with axial projections in that the coating has axially protruding orientation elements which align the valve disk with respect to individual valve seat surface.

Damping valves with direction-dependent pilot orifice sections are used in particularly demanding applications. A pilot orifice section is an auxiliary damping valve used particularly for low flow velocities. In the prior art, additional axially moveable valve disks and possibly valve springs are used for this purpose. But it can also be provided that the coating together with the valve disk forms a check valve that is separate from the valve seat surface in that the coating has a covering area for a through-opening in the valve disk, which covering area is not glued to the valve disk.

BRIEF DESCRIPTION OF THE DRAWINGS

The invention will now be described in more detail referring to the following description of the figures.

The drawings show.

DETAILED DESCRIPTION OF THE PRESENTLY PREFERRED EMBODIMENTS

Figure 1:
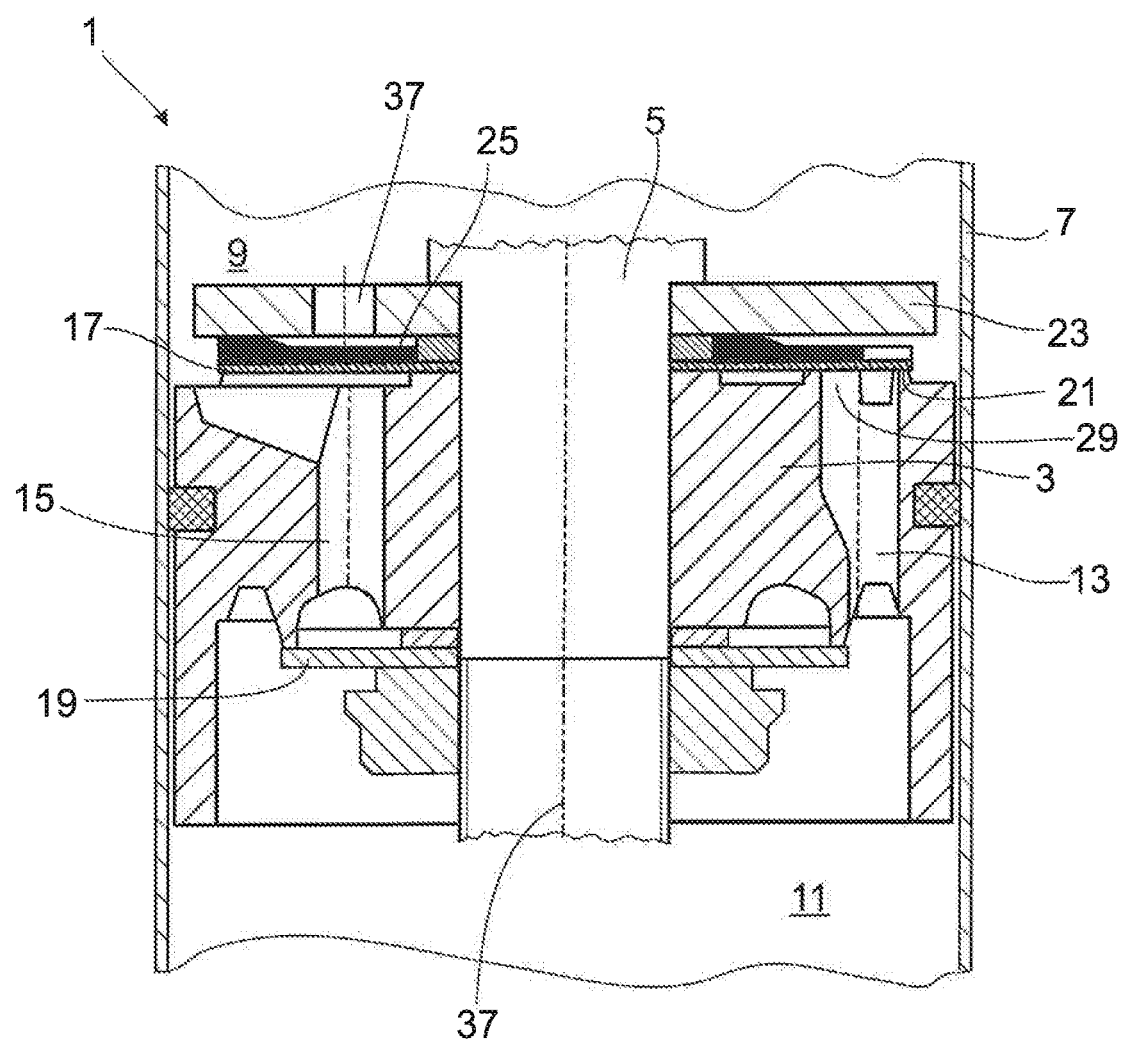
FIG. 1 is a damping valve in sectional view.

FIG. 1 shows a damping valve 1 for a vibration damper of any constructional type. Damping valve 1 comprises a damping valve body 3 fastened to a piston rod 5. The invention is not limited to an embodiment form of this type and can be used, e.g., in a bottom valve or also within the framework of an adjustable damping valve.

Damping valve body 3 divides a cylinder 7 of the vibration damper into a working chamber 9 on the piston rod side and a working chamber 11 remote of the piston rod. Both working chambers 9; 11 are filled with damping medium.

Through-channels 13; 15, each for a flow direction, are formed on different pitch circles in damping valve body 3. The configuration of the through-channels is to be considered as exemplary only. An outlet side of through-channels 13; 15 is at least partially covered by at least one valve disk 17; 19.

When there is an incident flow against valve disk 17 proceeding from the working chamber 11 remote of the piston rod 5, valve disk 17 lifts up from its valve seat surface 21. The lift movement is controlled or braked in a damping manner by a supporting disk 23 in combination with an elastic coating 25. The elastic coating exerts a varying supporting force on valve disk 17 via the configuration of its top surface with respect to valve disk 17.

Figure 2:
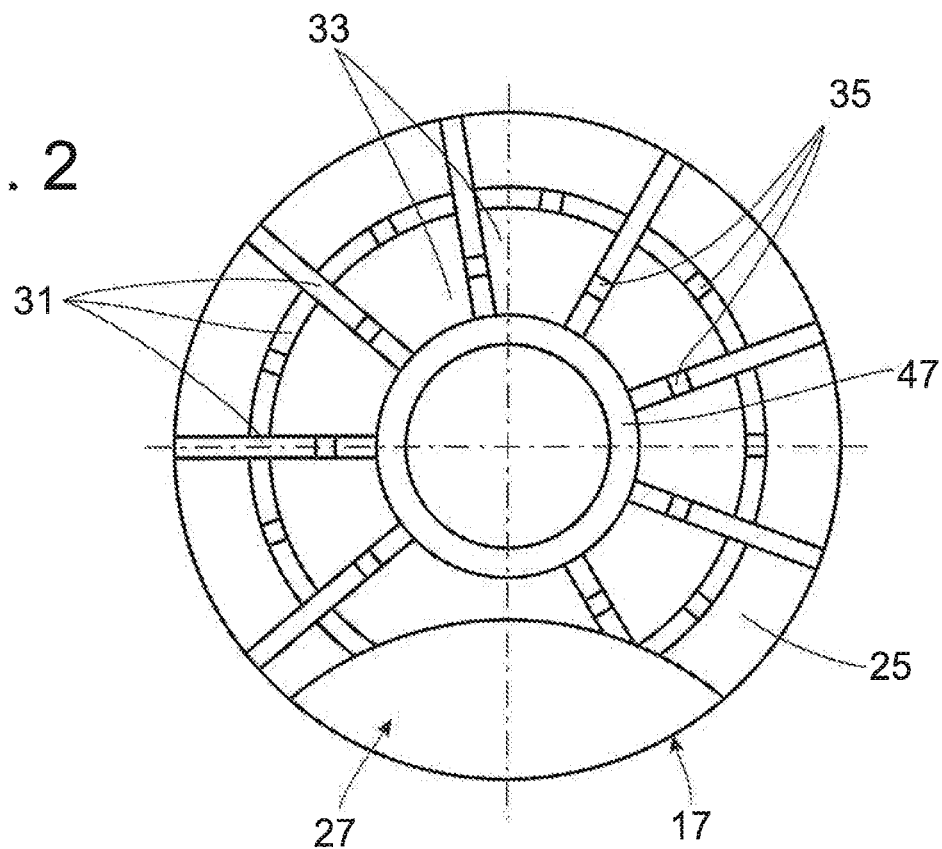
FIGS. 2 and 3 are valve disk variants.

As can be discerned from FIG. 1 and FIG. 2 viewed in conjunction, the elastic coating 25 covers only a partial area of the valve disk. Accordingly, a free partial area 27 remains such that valve disk 17 has a lower spring stiffness in this location and can accordingly lift even at a lower inflow pressure via through-channels 13. In this damping valve body 3, all of the through-channels feed into a common annular channel 29, which is defined by an inner valve seat surface 21*i* and an outer valve seat surface 21*a*.

As can further be discerned from FIG. 1, the coating has a varying thickness. In the left half of the sectional view, the elastic coating 25 already abuts the supporting disk 23 at the outer edge in the neutral position 31, whereas there is a clear gap farther radially inward.

Viewed in conjunction with FIG. 2, it will be seen that the varying thickness can also be carried out in the form of a rib profile, which defines displacer spaces 33. These displacer spaces 33 communicate with one another via channels 35 so that the damping medium located therein can flow out via axial openings 37 in supporting disk 23 or the outer displacer spaces 33.

Figure 3:
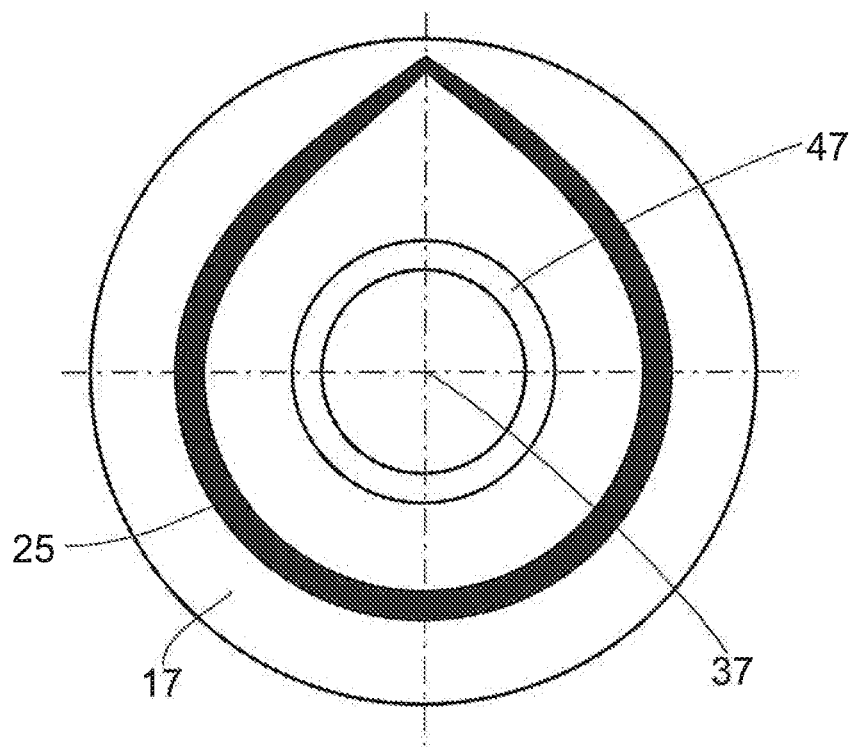

It will be appreciated from FIG. 3 that elastic coating 25 can also be carried out off-center to a main axis 37 of valve disk 17. Main axis 37 of valve disk 17 is coextensive with the longitudinal axis of piston rod 5. An off-center elastic coating 25 results in a maximum supporting force in the area of the smallest edge gap with respect to valve disk 17 and a minimum supporting force in the area of the greatest edge gap with respect to valve disk 17.

Figure 4:
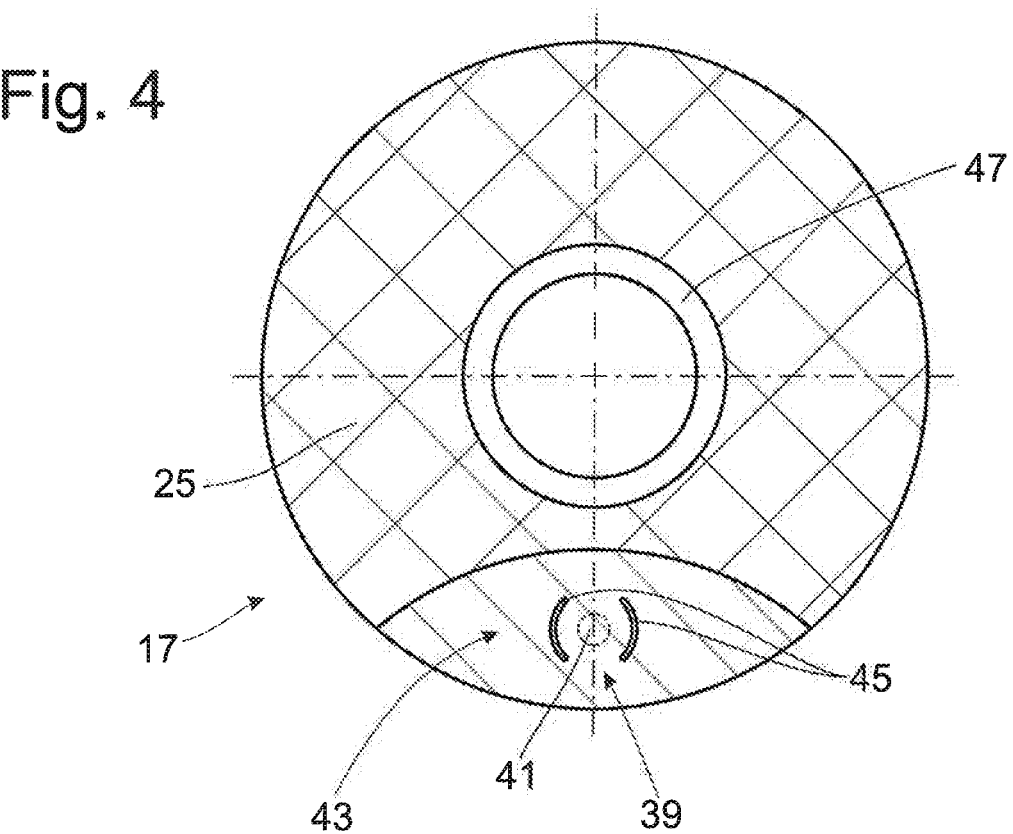
FIGS. 4 and 5 are a valve disk with a check valve.

FIG. 4 shows a valve disk 17 with an elastic coating 25, which forms a check valve 39 separate from seat surfaces 21*i*; 21*a* of annular channel 29. To this end, valve disk 17 has a through-opening 41 covered by coating 25 in closing direction, through-opening 41 being arranged in a covering area 43 that is not glued. "Not glued" does not necessarily mean that the coating is fixed by an adhesive. In fact, the coating is "detachable" from the valve disk.

Figure 5:
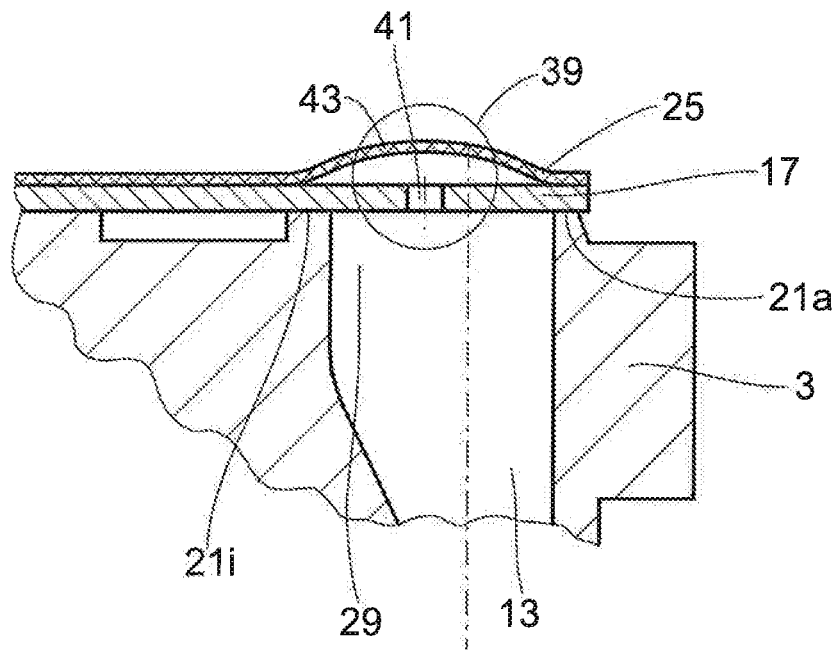

When a flow impinges on valve disk 17 from the underside, coating 25 lifts from valve disk 17 in the covering area 43, which is not glued as is shown in FIG. 5. In this case, the flow of damping medium can exit radially into working chamber 9. However, outlet openings 45 in the elastic coating would also be conceivable.

All of the valve disks 17 described up to this point have the feature that the coating is carried out outside of a clamping surface 47 of valve disk 17. An additional spring effect within the clamping chain between damping valve body 3, valve disk 17 and supporting disk 23 is prevented in this way.

Figure 6:
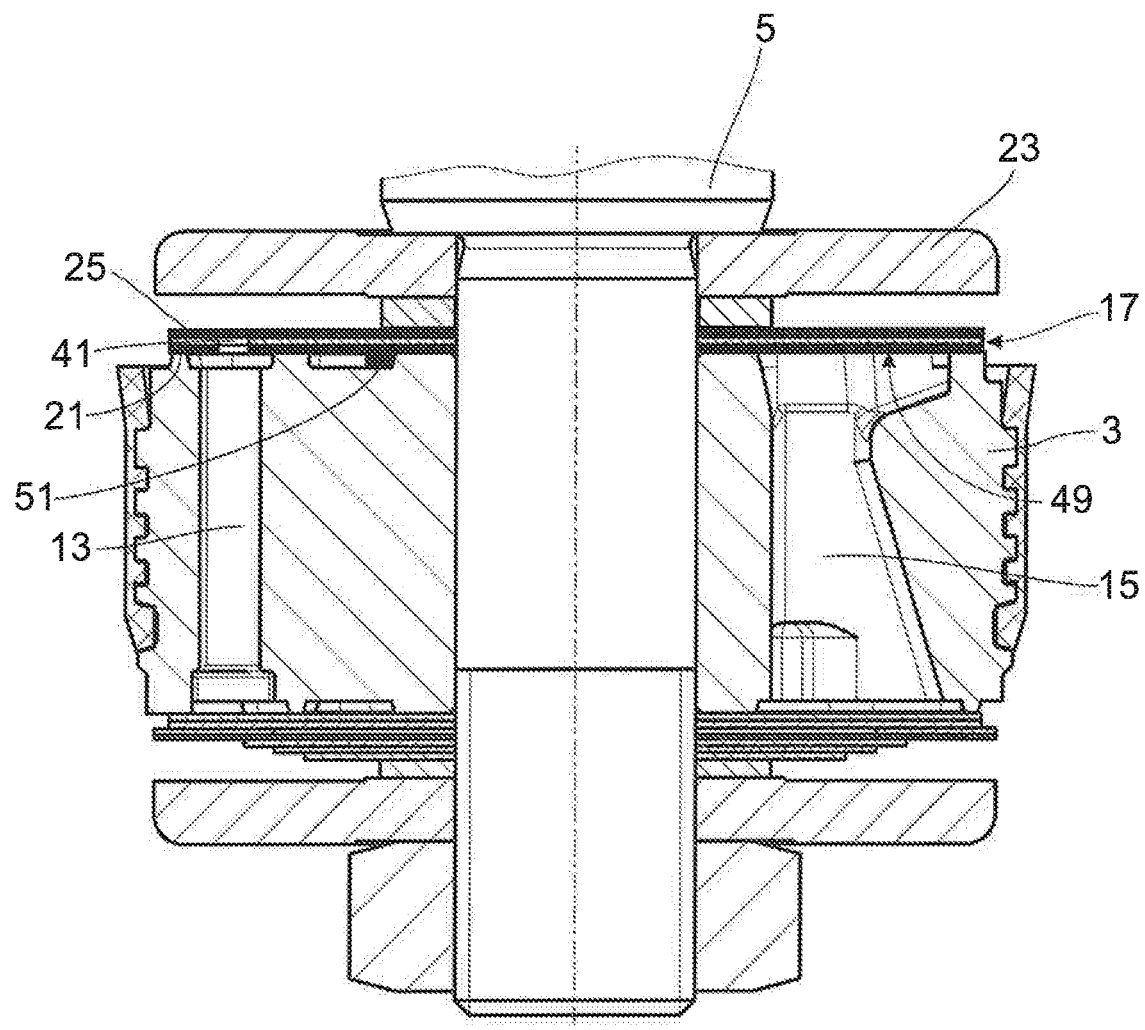
FIG. 6 is a valve disk with coating in closing direction.
Figure 7:
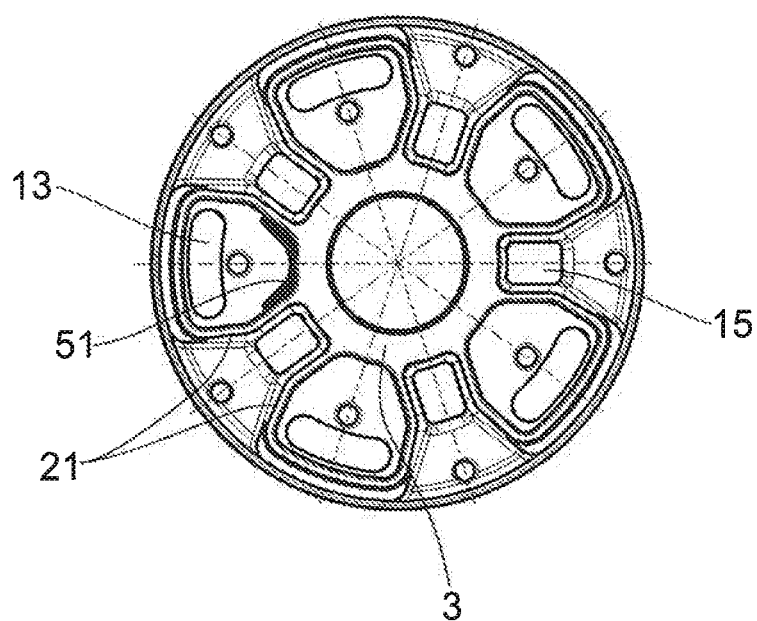
FIG. 7 is a top view of the damper valve body according to FIG. 6.

FIG. 6 shows a damping valve 1 with very similar structural component parts. By contrast, damping valve body 3 has separate valve seat surfaces 21 as is shown in FIG. 7. Additionally or alternatively with respect to the arrangements according to FIGS. 1 to 5, valve disk 17 has an elastic coating 49, which is formed in impact direction on valve seat surfaces 21 of damping valve body 3. Further, valve disk 17 has, as part of the elastic coating 49, an axially protruding orientation element which orients valve disk 17 in circumferential direction relative to valve seat surface 21. The logic behind this will be appreciated from the figure, particularly with a valve disk combined with a check valve according to FIG. 4 and FIG. 5 with a damping valve body 5 according to FIG. 6, since check valve 39 is always oriented with respect to an individual outlet opening which is enclosed by the raised valve seat surface 21 via axial orientation element 51 which is shown in an exemplary manner in FIG. 7. It will be appreciated that the orientation element 51 can also engage between the separated seat surfaces 21.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A damping valve for a vibration damper, comprising:
    at least one valve disk that is elastically deformable;
    a damping valve body with a through-channel whose outlet opening is at least partially closed by the at least one valve disk; and
    a further valve element associated with the valve disk, that predetermines a defined lift behavior for the valve disk proceeding from a valve seat surface, wherein the further valve element is formed by an elastic coating of the valve disk, which exerts a varying supporting force with respect to the valve disk via a configuration of a top surface of the valve disk,
    wherein the elastic coating is formed as a stop limit in a lift direction of the valve disk.

2. The damping valve according to claim 1, wherein the elastic coating covers only a partial area of the valve disk.

3. The damping valve according to claim 1, wherein the elastic coating has a varying thickness.

4. The damping valve according to claim 3, wherein the varying thickness is carried out in a form of a rib profile that defines at least one displacer space.

5. A damping valve for a vibration damper, comprising:
    at least one valve disk that is elastically deformable;
    a damping valve body with a through-channel whose outlet opening is at least partially closed by the at least one valve disk; and
    a further valve element associated with the valve disk, that predetermines a defined lift behavior for the valve disk proceeding from a valve seat surface, wherein the further valve element is formed by an elastic coating of the valve disk, which exerts a varying supporting force with respect to the valve disk via a configuration of a top surface of the valve disk,
wherein the elastic coating is carried out off-center with respect to a main axis of the valve disk.

6. A damping valve for a vibration damper, comprising:
at least one valve disk that is elastically deformable;
a damping valve body with a through-channel whose outlet opening is at least partially closed by the at least one valve disk; and
a further valve element associated with the valve disk, that predetermines a defined lift behavior for the valve disk proceeding from a valve seat surface, wherein the further valve element is formed by an elastic coating of the valve disk, which exerts a varying supporting force with respect to the valve disk via a configuration of a top surface of the valve disk,
wherein the elastic coating is carried out outside of a clamping surface of the valve disk.

7. The damping valve according to claim 1, wherein the elastic coating is carried out in impact direction on the valve seat surface.

8. The damping valve according to claim 7, wherein the elastic coating has axially protruding orientation elements that align the valve disk with respect to an individual valve seat surface.

9. The damping valve according to claim 1, wherein the elastic coating together with the valve disk forms a check valve that is separate from the valve seat surface in that the elastic coating has a covering area for a through-opening in the valve disk, which covering area is not glued to the valve disk.

\* \* \* \* \*